US006529500B1

(12) United States Patent
Pandharipande (10) Patent No.: US 6,529,500 B1
(45) Date of Patent: Mar. 4, 2003

(54) UNIFIED MESSAGING NOTIFICATION (75) Inventor: Milind Manohar Pandharipande, Lewisville, TX (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/383,302

(22) Filed: Aug. 26, 1999

(51) Int. Cl.[7] .............................................. H04L 12/28
(52) U.S. Cl. .................................. 370/352; 379/88.17
(58) Field of Search .............................. 370/351, 352, 370/353, 354, 355, 230, 230.1, 231, 235, 401, 428; 379/88.17, 88.18, 88.12, 88.13, 88.25; 709/204, 218, 228

(56) References Cited

U.S. PATENT DOCUMENTS

| | | | | |
|---|---|---|---|---|
| 6,233,318 B1 | * | 5/2002 | Picard | 379/88.17 |
| 6,385,202 B1 | * | 5/2002 | Katseff | 370/401 |
| 6,396,907 B1 | * | 5/2002 | Didcock | 379/88.17 |
| 6,404,762 B1 | * | 6/2002 | Luzeski | 370/352 |
| 6,411,685 B1 | * | 6/2002 | O'Neal | 379/88.14 |
| 6,430,177 B1 | * | 8/2002 | Luzeski | 370/352 |
| 6,438,215 B1 | * | 8/2002 | Skladman | 379/67.1 |
| 6,438,217 B1 | * | 8/2002 | Huna | 379/88.14 |
| 6,459,774 B1 | * | 10/2002 | Ball | 379/67.1 |
| 6,477,240 B1 | * | 11/2002 | Lim | 379/67.1 |

* cited by examiner

Primary Examiner—Douglas Olms
Assistant Examiner—Ricardo M. Pizarro
(74) Attorney, Agent, or Firm—Leonard Charles Suchyta (57) ABSTRACT

Method and apparatus for unified messaging is described. More particularly, a visual or audible indication is provided to a served party that one or more messages are waiting on a network based centralized mail accumulation system. These messages may be voicemail, e-mail, fax mail, data mail, video mail, videoconference mail, picture mail, and the like, including without limitation any combination thereof. This notification is accomplished in part through use of an application running on a mail accumulation system or on an adjunct computer serving multiple mail accumulation systems. This application may be operatively coupled to customer premises' equipment and a message waiting indicator device. This coupling may be achieved using telephone wiring.

49 Claims, 6 Drawing Sheets

UNIFIED MESSAGING NOTIFICATION

FIELD OF THE INVENTION

The present invention generally relates to information technology, and more particularly relates to unified messaging.

BACKGROUND OF THE INVENTION

Many telecommunication companies now offer a voicemail service. In a conventional home use of voicemail service, a subscriber or other user is provided with a voicemail mailbox number (usually the subscriber's home telephone number) and a voicemail access number, different from their home telephone number. By calling this voicemail access number, the subscriber is prompted to enter their voicemail mailbox number and an associated password to access their voicemail. However, if a subscriber were to place such a call from a telephone number associated with the voicemail mailbox number (e.g., calling their home voicemail from their home telephone), then only the password need be entered by the subscriber to access their voicemail. When using such a voicemail associated telephone number, a subscriber may be audibly notified of voicemail, of which there may be one or more messages, by a "stutter dial tone" or frequency-shift-keyed (FSK) tones. This audible signal is conventionally sent in place of a more familiar dial tone to a subscriber's telephone. This type of message notification service is an "off-hook" type, namely, the subscriber's telephone is taken "off-hook" to listen for presence of an audible message notification signal.

Alternatively, there are "off-hook" devices, which may be coupled to a telephone or incorporated with a telephone, that allow such notification to be visually detected, as opposed to audibly detected, by a subscriber. For example, a telephone is put in an "off-hook" state to detect a "stutter dial tone," and if such a stutter dial tone is detected, then a visual notification (e.g., an illuminated light-emitting diode (LED)) is use to provide an indication to the subscriber of the presence of voicemail. However, this approach still does employ taking the subscriber's telephone number off-hook (e.g., making the service otherwise unavailable or "busy") and provides limited information with respect to number of messages, calling party origin, and the like.

Some newer telephones are capable of receiving FSK information while in an "on-hook" state. Such FSK information may be transmitted from a "Central Office" (CO). By way of example, a CO may notify a subscriber of voicemail by sending FSK signals to the subscriber's telephone. This FSK information may appear as a visual indicator of voicemail present, such as on a liquid crystal display (LCD), for the subscriber. However, not all COs support FSK transmission of this sort, and subscribers will have to purchase newer telephones. Moreover, other telecommunication offerings include fax mail and e-mail messaging, and thus a subscriber may have to access three separate mailboxes to collect all the messages.

However, advent of the Internet Protocol (IP) and Voice Over Internet Protocol (VOIP) allows for network-based unified messaging services. Such unified messaging combines voicemail, fax mail, and e-mail. So a subscriber or customer may access through a personal computer, Public Switched Telephone Network (PSTN) phone, cellular phone, personal data assistant, World Wide Web television, or like device capable of accessing the Internet one mailbox capable of having all three types of messages. To offer a cost effective unified messaging service, message service providers are centralizing messaging platforms to serve multiple areas on a regional basis. Such a regional basis may be defined geographically, nationally, demographically, or otherwise. Access to such a centralized messaging platform may be provided through a local Internet Service Provider (ISP), an ISP's local access point-of-presence (POP), an message service providers' local access POP, an enterprise network, a virtual private network, among others.

Currently in the United States, Regional Telephone ("Bell") Operating Companies dominate voicemail services owing at least in part to their "Local Loop" control. However, by providing a unified messaging service over the Internet, subscribers may choose solutions other than those offered by the Local Telephone Company. Unfortunately, dial tone, whether stutter dial tone or FSK tone(s), is controlled by the Local Telephone Company, so using such dial-tone to alert a subscriber of one or more messages may not be used in the above-described unified messaging service. Moreover, some sort of message alert, whether audible or visual, is a key feature of any messaging service.

Accordingly, it would be desirable to provide a unified messaging service having an audible or a visual alert to indicate presence of one or more new messages that uses dial-tone.

SUMMARY OF THE INVENTION

The present invention provides method and apparatus for unified messaging. More particularly, the present invention provides a messaging interface configured to provide an indication of a number of messages for each of a plurality of message types. The messaging interface may be operatively coupled to a messaging server. The messaging server is programmed with an application program for selectively accessing a database of mailboxes and for providing an indication of mailbox status. Connectivity between messaging interface and messaging server may include converting a public switched telephone network call to a voice over internet protocol call. The plurality of message types may be selected from voicemail, fax mail, e-mail, data mail, video mail, picture mail and videoconference mail. The messaginng interface may be disposed within a point-of-presence, and the messaging server may be disposed within a remote unified messaging network.

Advantageously, the present invention provides a visual and/or an audible indication of status of messages of different types for a message store associated with a subscriber. This may be accomplished with dual tone multiple frequency or frequency shift keyed tone sequences. By using dial tone, standard twisted pair telephone wiring may be used for connectivity. Moreover, a unified messaging service as disclosed herein may be provided nationally or internationally without necessarily being provided by a regional telephone operating company.

These and other features, advantages, objects and embodiments of the present invention will become more apparent from reading the following Detailed Description of the Preferred Embodiments or by practicing the present invention.

DESCRIPTION OF THE DRAWINGS

The features of the present invention, as well as objects and advantages, will best be understood by reference to the appended claims, detailed description and accompanying drawings where:

In the drawings, same reference numbers refer to like components throughout the several figures.

DETAILED DESCRIPTION OF THE PREFERRED EMBODIMENTS

In the following detailed description, reference is made to the accompanying drawings which form a part of this detailed description, and in which, shown by way of illustrative example, specific embodiments are described. These embodiments are described in sufficient detail to enable those of skill in the art to practice the present invention. However, it is to be understood that other embodiments of the present invention not described herein in detail may be utilized. Therefore, the following detailed description is not to be taken in a limiting sense.

Figure 1:
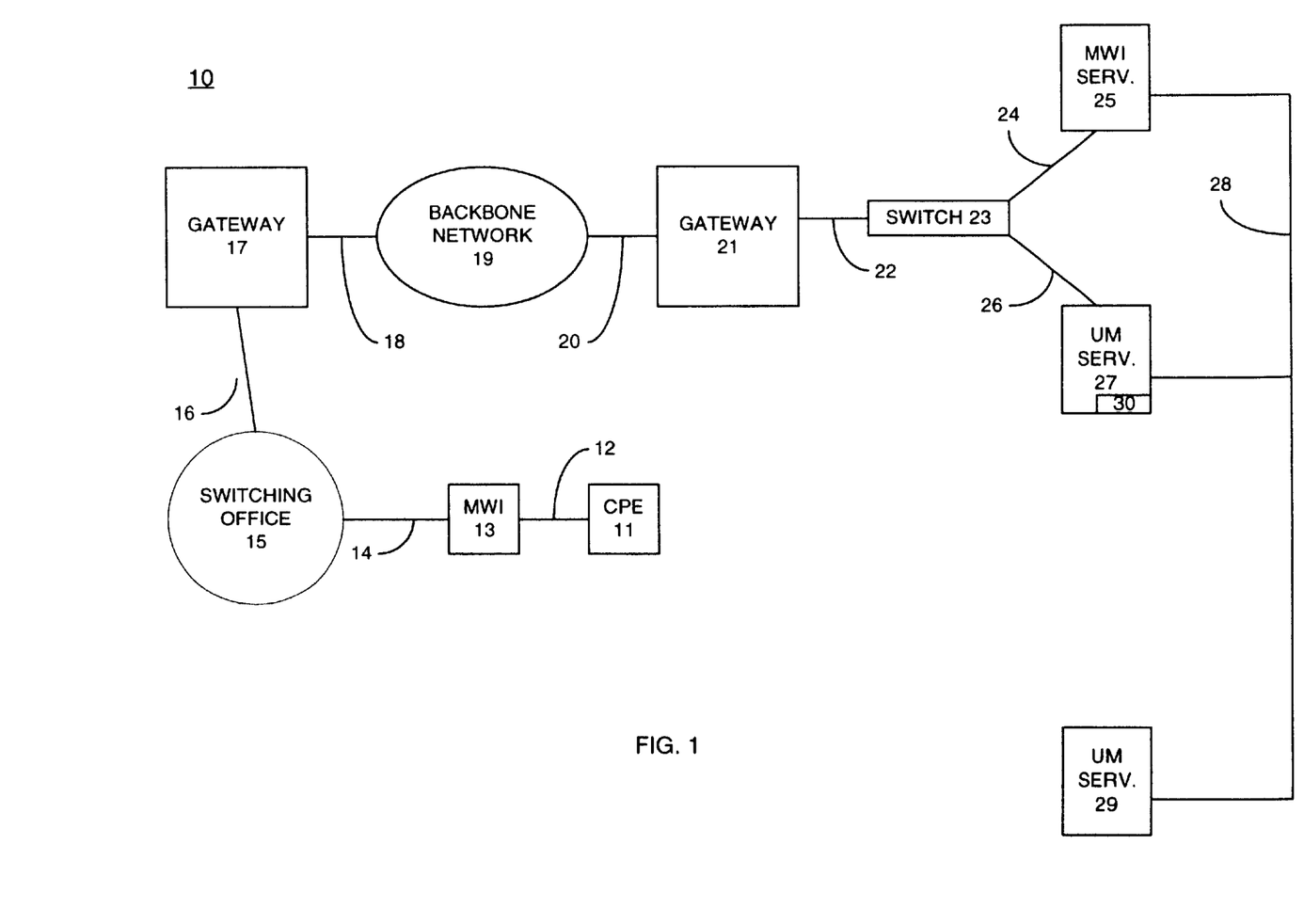
FIG. 1 is a block diagram of an exemplary portion of mail accumulation system in accordance with an embodiment of the present invention.

Referring to FIG. 1, there is illustratively shown a block diagram of an exemplary portion of mail accumulation system 10 in accordance with an embodiment of the present invention. Mail accumulation system 10 comprises message-waiting interface (MWI) device 13 operatively coupled to customer premises equipment (CPE) 11 via communication link 12. The term "communication link" as used herein may comprise one or more of coaxial cable connection, copper line connection, fiber optic line connection, broadcast transmission (e.g., satellite, cellular, radio, and the like) connection, or other form of electrical communication. MWI device 13 and CPE 11 may be integrated as a single unit or may be separate units. CPE 11 may comprise one or more of a telephone, a fax machine, a personal computer, a personal data assistant, a terminal, or the like. MWI device 13 is operatively coupled to a telephone switching matrix, which may be a local switching office or a central office (CO) 15, via local loop network 14. Switching office 15 is operatively coupled via a communication link 16, which may comprise a primary rate interface (PRI), to gateway 17, which may be an IP/PSTN gateway. Gateway 17 is operatively coupled to backbone network 19 via interface 18, which may be an IP interface. Backbone network 19 may comprise a SONET, Frame, ATM or any other Global Network Infrastructure. Backbone network 19 may form a portion of the Internet. Backbone network 19 is operatively coupled via interface 20, which may be an IP interface, to gateway 21, which may be an IP/PSTN gateway. Gateway 21 is operatively coupled to switch 23 via link 22, which may comprise a primary rate interface. Switch 23 may be a single switch or a matrix of switches. Moreover, switch 23 may be public or private. Switch 23 is operatively coupled to MWI server 25 and unified messaging (UM) server 27 via links 24 and 26, which may respectively comprise primary rate interfaces. MWI server 25, UM server 27 and UM server 29 are operatively coupled to one another via local area network (LAN) connection 28. Gateway 21 may be directly connected to LAN 28 provide direct IP connectivity is available, and LAN 28, or more particularly a server thereon, is configured with web server software.

A first call is placed to CPE 11 over local loop 14. CPE 11 is now in an "off-hook" (busy) condition owing to this first call. A second or any subsequent call is forwarded to UM server 27 by switching office 15 while CPE 11 is in such a busy condition. When this busy condition no longer exists, MWI device 13 places a VOIP call over backbone network 19 to server 25 to check for any new messages deposited from callers of forwarded calls. If CPE 11 were not in a busy state and if no one answered CPE 11, MWI device 13 calls MWI server 25 to check for any new messages deposited by callers, after a number of rings of CPE 11. Also, if CPE 11 is unconditionally call forwarded to voicemail, MWI device 13 may dial MWI server 25 periodically to check for any new messages deposited on UM server 27. MWI server 25 queries UM data store 30, which comprises one or more databases, for a target customer message address or box ("mailbox") associated with CPE 11.

To determine if one or more messages 30, which may comprise voice mail, fax mail, e-mail, data mail, video mail, videoconference mail, picture mail, and the like, are deposited on a network-based unified messaging server, such as UM server 27, MWI device 13 dials MWI server 25.

Caller UM Server Connectivity

Figure 2:
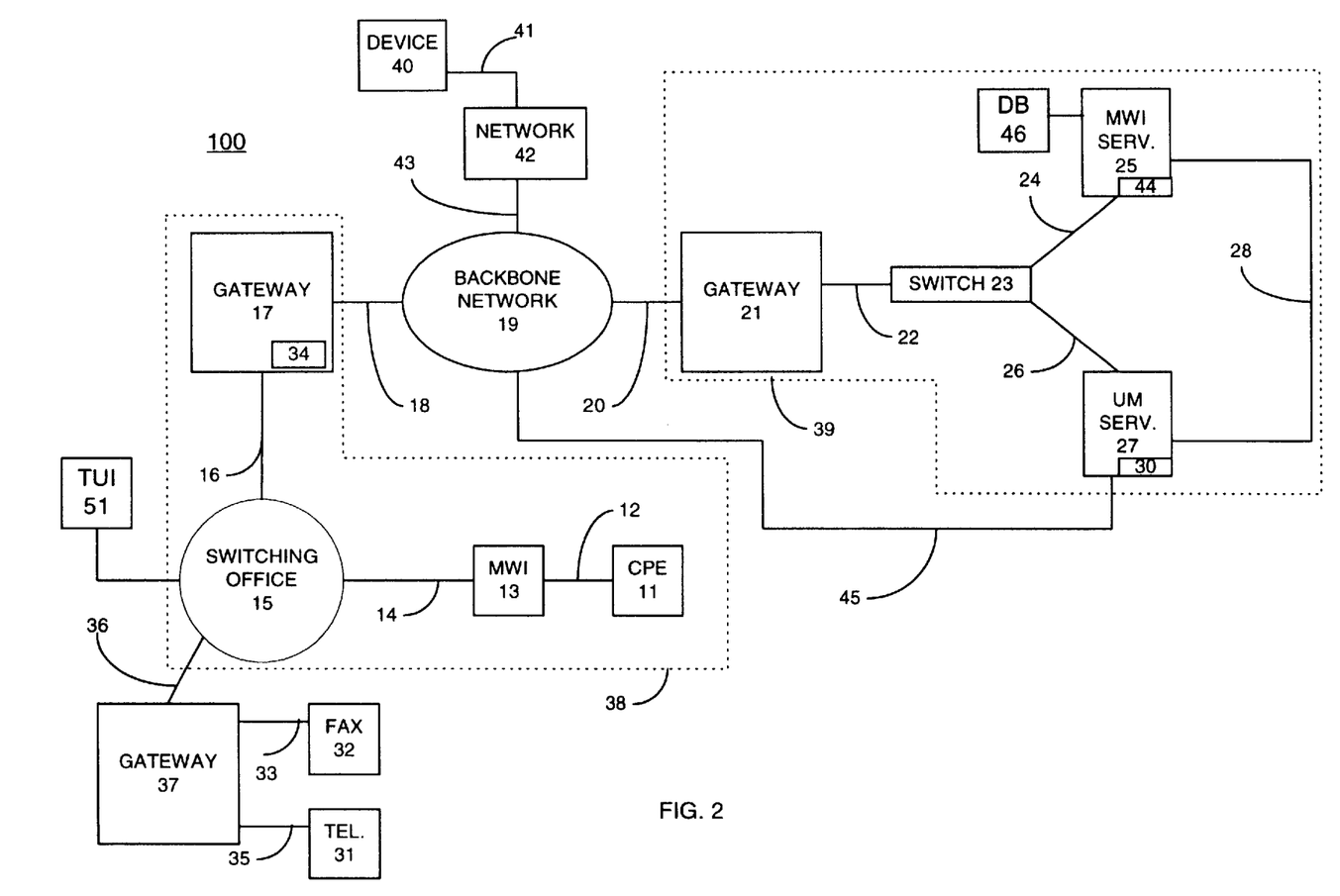
FIG. 2 is a block diagram of an exemplary portion of a network having a centralized messaging platform in accordance with an embodiment of the present invention.

Referring to FIG. 2, there is illustratively shown a block diagram of an exemplary portion of a network 100 having a centralized messaging platform in accordance with an embodiment of the present invention. Suppose a caller initiates a call from telephone 31 to a unified message subscriber associated with CPE 11 of local access POP 38. This call goes from telephone 31 over communication link 35 to PSTN gateway 37 to a switching office 15, such as a local switching office, via communication link 36. Assuming CPE 11 in an "on-hook" or available condition but it is not answered after a certain duration of time, number of rings or the like, MWI device 13 may continue to monitor activity associated with this incoming call in case it is answered anytime. Switching office 15 obtains caller identification information ("caller ID" or CID), if available, and subscriber redirected number (RDN) information associated with this call. Switching office 15 sends this call and caller and subscriber information to local IP/PSTN gateway 17 over PRI link 16.

IP/PSTN gateway 17 formats this call for VOIP ("VOIP call") and initiates a database query of database 34 using at least in part CID or RDN information obtained from switching office 15. Database 34 may be internal or external to IP/PSTN gateway 17. Information obtained as a result of such a query is used for destination routing for such a VOIP call. This destination routing information comprises an IP address for IP/PSTN gateway 21. This "VOIP call" and optionally associated caller and subscriber information is provided from IP/PSTN gateway 17 to IP/PSTN gateway 21 over IP data links 18, 20 and backbone network 19 using VOIP connectivity. Based on pre-defined routing rules, this VOIP call is routed by IP/PSTN gateway 21 of remote UM server network 39 to an appropriate PRI link 22 and through local switching matrix 23. Notably, IP/PSTN gateway 21 converts this VOIP call into a "PSTN call" for routing over PRI link 22. Local switching matrix 23 routes this "PSTN call" over PRI link 26 to UM server 27. Accordingly, telephone 31 is now operatively coupled to UM server 27, and as such a caller may interact with a unified messaging application having one or more interactive voice response or dial tone menus and/or deposit a voicemail message for a target subscriber. Though a subscriber's voicemail box is located in database 30 of UM server 27 operatively coupled to MWI server 25, it should be appreciated that a server, which is a combination of MWI server 25 and UM server 27, operatively coupled to an internal or external database 30 may be used.

MWI Connectivity with UM Server for an Unanswered Incoming Call

If an incoming call is not answered, MWI device 13 waits for some duration of time. This duration of time may be pre-programmed into MWI device 13 or programmed by an UM service subscriber. Such duration of time should be programmed to be greater than a maximum amount of time allowed for a voicemail message. Preferably, MWI device 13 providers program this duration of time, and MWI device 13 is configured such that users are not readily able to modify such duration of time.

After waiting for this duration of time, MWI device 13 places an out going call through switching office 15, which may be a local switching office, using an access telephone number associated with POP 38. Notably, access telephone number use is well known with respect to accessing an Internet service provider (ISP). This access telephone number may be pre-programmed into MWI device 13 by a provider thereof or programmed by an UM service subscriber. In an embodiment, this out going call is made no more than once and made within four minutes after the end the incoming call. However, such an out going call may be place one or more times after an incoming call has terminated.

Switching office 15 forwards Automatic Number Identification (ANI) and Dialed Number Identification Service (DNIS) information along with such an out going call to IP/PSTN gateway 17, which may be a local gateway. This ANI and DNIS information is associated with MWI device 13, or more particularly an UM service subscriber's telephone number associated with MWI device 13.

IP/PSTN gateway 17 initiates a database query of database 34 using at least in part ANI or DNIS information obtained from switching office 15. IP address information obtained as a result of such a query is used for destination routing for this outgoing call. Accordingly, this outgoing call is converted to a VOIP call. This VOIP call is routed along with DNIS information to IP/PSTN gateway 21 of remote UM server network 39 over backbone network 19 via IP interfaces 18 and 20. IP/PSTN gateway 21 converts this VOIP call to a PSTN call. IP/PSTN gateway 21 uses associated DNIS information received to route this PSTN call through switching matrix 23 to MWI server 25. Accordingly, MWI device 13 is operatively coupled to MWI server 25 provided this incoming PSTN call is answered.

Before answering, visual/audio MWI ("VAMWI") application 44 running on MWI server 25 queries database 30 to access a target subscriber's mailbox to determine if there are any new messages whether voicemail, fax mail, e-mail, video mail. video/audio (videoconference) mail, or like message type. "VAMWI" application 44 queries database 30 using ANI information received. If there are no new messages, this incoming PSTN call may not be answered by VAMWI application 44 on MWI server 25. If one or more new messages are present, VAMWI application 44 on MWI server 25 answers such an incoming PSTN call. By answering, MWI server 25 transmits DTMF to nes to MWI device 13. These DTMF tones may indicate message type and number of messages of each type. Table 1 provides examples of dual tone multiple frequency ("DTMF") tone sequences that may be used for voicemail and e-mail.

TABLE 1

| DTMF Tone Sequence | Description |
| --- | --- |
| *A[0–9]+# | Voicemail Messages |
| *B[0–9]+# | E-mail Messages |
| *C[0–9]+# | Fax Mail Messages |
| *D[0–9]+# | Video Mail Messages |

By way of example and not limitation, a DTMF tone sequence may be *A3#B21#C3#D8#*. This sequence would indicate that there are 3 new voicemail messages, 21 new e-mail messages, 3 new fax mail messages, and 8 new videoconference messages. A "*" DTMF tone is used as a beginning and as a terminating sub-sequence character; an alpha DTMF tone is used as a message type character; and a numeric DTMF tone is used as a number of messages character.

MWI device 13 detects these tones and may visually provide corresponding information on a display 47 (illustratively shown in FIG. 3), integral or external thereto. Moreover, a visual alert may be provided to indicate one or more new messages are present, such as a flashing light. Accordingly, MWI device 13 may be advantageous to those with auditory impairment. Optionally, MWI device 13 may provide an audible expression of this corresponding information. This audible expression may be in a form of beeping or speech communication via a speaker 48 (illustratively shown in FIG. 3). Moreover, an audible alert may be provided to indicate new messages are present. Accordingly, MWI device 13 may be advantageous to those with visual impairment. Furthermore, MWI device 13 may be configured to provide both visual and auditory alerts, as well as both visual and auditory forms of information corresponding to a received DTMF tone sequence, or any combination thereof. Configuring of MWI device 13 may be achieved at least in part through use of input-panel 49 (illustratively shown in FIG. 3).

MWI device 13 may increment a number of messages from a prior DTMF tone sequence, and MWI device 13 may delineate between prior messages already accessed by a user and new messages not accessed by a user. Alternatively, if MWI device 13 detects presence of one or more new messages, it may be configured not to make any additional inquiries to MWI server 25 until a user resets a new mail notification.

Notably, if MWI device 13 is in session with MWI server 25 and during that session MWI detects any other extension in use, MWI device 13 will discontinue its session with MWI server 25. After MWI device 13 detects that an extension in use condition no longer exists, it may re-initiate a session with MWI server 25 as previously described.

MWI Connectivity with UM Server for a Busy Condition and an Incoming Call.

Similarly, if such a call is placed from telephone 31 to a unified message subscriber associated with CPE 11 of local access POP 38, a s previously described, and CPE 11 is in an "off-hook" or busy condition owing to being engaged in another call, such as a voice call, fax call, videoconference call, data call, or the like, then in response to this incoming call and such a busy condition MWI device 13 places an out bound call. This out bound call may be placed using a pre-programmed access telephone number. In an embodiment of the present invention, placing this out bound call is attempted only once within four minutes after CPE 11 is back to an "on-hook" condition. MWI device 13 may verify that CPE 11 is in an on-hook condition prior to placing such an out bound call.

Switching office 15, which may be a local switching office, receives this out bound call from MWI device 13 and forwards ANI and dialed number identification service (DNIS) information associated with such an incoming call to IP/PSTN gateway 17, which may be a local gateway. Using the above-described route selection, IP/PSTN gateway 17 routes this call, as a VOIP call, to IP/PSTN gateway 21, which may be a remote gateway. Using DNIS information, remote IP/PSTN gateway 21 routes this call, as a PSTN call, to MWI server 25 through switching matrix 23. VAMWI application 44 running on MWI server 25 queries mailbox database 30 on UM server 27 to determine if any new messages are present of an associated subscriber. If new messages are present, MWI server device 13 answers this incoming call, and then transmits DTMF tones as previously described.

Message Checks of a UM Server

Notably, a call placed from telephone 31 or fax machine 32 may not ring CPE 11. Accordingly, suppose a call was placed from a fax machine, personal computer or data assistant configured without initial routing to CPE 11. Suppose a fax from fax machine 32 is sent over communication link 33 to gateway 37, and then directly to a subscriber's unified messaging mailbox by dialing a subscriber's Direct Inward Dialing Number (DID). Moreover, any message may be directly deposited to a subscriber's UM mailbox in database 30. For example, data device 40, which may comprise a personal computer, a personal data assistant, a terminal, or like device, may be operatively coupled to network 42 via data link 41. Network 42 may comprise a portion of the Internet or other network capable of being put in electrical communication with backbone network 19. Data link 41 and 43 may comprise coaxial cable connection, copper line connection, fiber optic line connection, broadcast transmission (e.g., satellite, cellular, radio, and the like) connection, or other electrical communication including some combination thereof. Accordingly, a message, whether voice, data, video, picture, videoconference, e-mail, or the like, may be transmitted from data device 40 to network 42 via data link 41 and then to backbone network 19 via IP link 43. Such WP address information may be directly provided to an Internet Service Provider ("ISP") operating UM server 27 via backbone network 19 and IP links 43 and 45. Notably, in direct Internet embodiment, backbone network 19 may be bypassed provided there is connectivity from link 43 to link 45.

Accordingly, to counter messages going to UM server 27 without any notification to MWI device 13, periodic queries may be performed as initiated by MWI device 13. Frequency of such queries may be programmed by a user or preprogrammed by a manufacturer of MWI device 13. An upper limit of such queries may be imposed to limit network traffic. In such an embodiment, MWI device 13 would place an outgoing call as previously described, and VAMWI application 44 and MWI server 25 would operate as previously described to determine if one or more new messages were present and answer if they were present.

User Interface

MWI device 13 may place an out bound call by dialing an access number. However, preferably a local access number would be dialed. There are several embodiments for configuring MWI device 13 to do this.

MWI device 13 may be pre-programmed with a toll or toll free access number prior to shipping to a customer or subscriber. When MWI device 13 was connected and powered-up, it would dial this pre-programmed access number. This call will be sent to MWI server 25, along with ANI information, as previously described. Using ANI information obtained from switching office 15, MWI server 25 would query database 46, internal or external thereto, to determine a local access POP number for this subscriber. If there was such a number MWI server 25 would then answer this call and transmit DTMF tones corresponding to such a local access POP number to MWI device 13. MWI device 13, detecting such tones, would store them in memory for subsequent out bound calling.

Figure 3:
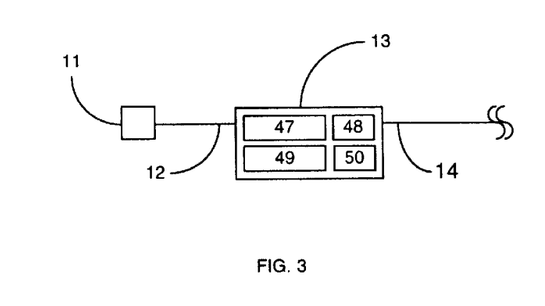
FIG. 3 is a block diagram of an exemplary portion of the network of FIG. 2 having a "plain old telephone" (POT) in accordance with an embodiment of the present invention.

If ANI information is not available or guaranteed, CPE 11 may comprise a "plain old telephone" (POT), as illustratively shown in the block diagram FIG. 3. A user via input-device 49, such as a keyboard, puts MWI device 13 in a program mode and sets it to off-hook, and then dials a local access number on this POT. MWI device 13 listens for DTMF tones and stores DTMF digits associated therewith in memory for subsequent out bound calling. Information about a local access number may be provided to a user through collateral means, through the Internet, or through any other suitable means.

MWI 13 may comprise a keypad 50, or other input connection such as a data input port or microphone, that a user may use to program MWI device 13 with a local access number.

With renewed reference to FIG. 2, a subscriber of a UM service may access their mailbox through a Telephony User Interface (TUI) 51 or a web browser interface on data device 40. TUI 51 may be used at premises where MWI 13 has not been installed. In such situations, a user may access one or more new messages from a location other than a location of MWI device 13. To avoid having MWI device 13 be out of synchronization with respect to a user's mailbox current status, a time/date stamp may be applied for each interaction with MWI 25 in which message status information is obtained from UM server 27. Such a stamp will be applied to MWI device 13 when it interacts with MWI 25 to obtain message status information from UM server 27. Accordingly, if a user accesses a mailbox from a location where MWI device 13 is not involved, then on a subsequent interaction between MWI device 13 and MWI server 25 a check may be made to determine if stamps match. If they do not match, then MWI device 13 needs to be re-synchronized with MWI server 25.

Figure 4:
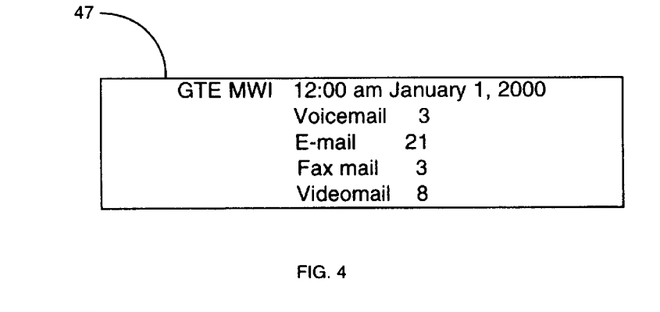
FIGS. 4 and 5 are plan views of exemplary embodiments of an output of message status information and time/date stamp information on a display of a message waiting indicator device in accordance with the present invention.
Figure 5:
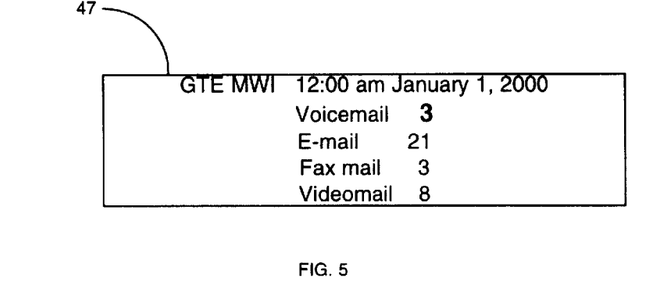

Referring to FIG. 4, there is illustratively shown an exemplary embodiment of an output of message status information and time/date stamp information on display 47 of MWI device 13. If any messages within a category are designated as urgent, a notification of this may be provide on display 47. Referring to FIG. 5, there is illustratively shown the exemplary embodiment of FIG. 4 with a bolded and font type increase to indicate presence of an urgent message within a voicemail category.

To avoid having to re-synchronize MWI device 13, VAMWI application 44 may originate a call to a subscriber's CPE 11. CID information of MWI server 25 would be forwarded with this call. MWI device 13 will detect this CID information and answer such a call. Once this call is answered by MWI device 13, MWI device 13 sends a DTMF tone sequence to notify MWI server 25 that such a call has been answered. In response, VAMWI application 44 sends a DTMF tone sequence to MWI device 13 to reset its status. Notably, if this MWI server 25 call is answered by a subscriber, VAMWI application 44 will not receive a DTMF tone sequence from MWI device 13 to indicate such a call was answered. For a condition where a subscriber answers a MWI server 25 call, a visual and/or audio announcement from VAMWI application 44 is provided to notify such a user that no new messages are present.

MWI device 13 may also be configured to support remote notification to a subscriber's other access numbers, such as cell phone number, pager number, or any other remote access number. Such one or more remote access numbers may be programmed into MWI device 13, as previously described with respect to programming in a local access number.

Though the aforementioned has been described in terms of DTFM tones, it should be understood that an FSK approach may be used, particularly a low rate of FSK tones. In this type of data transmission, ancillary information may be downloaded to MWI device 13, including without limitation stock quotes, local weather, and advertisements, in conjunction with querying database 30 for messages.

Accordingly, it should be appreciated that embodiments disclosed herein are not limited to stutter dial tone, which likely will decrease in usage with an increase in UM platforms. Moreover, embodiments disclosed herein are capable of working with a POT. Furthermore, embodiments disclosed herein facilitate avoiding long distance access charges for mailbox access.

Figure 6:
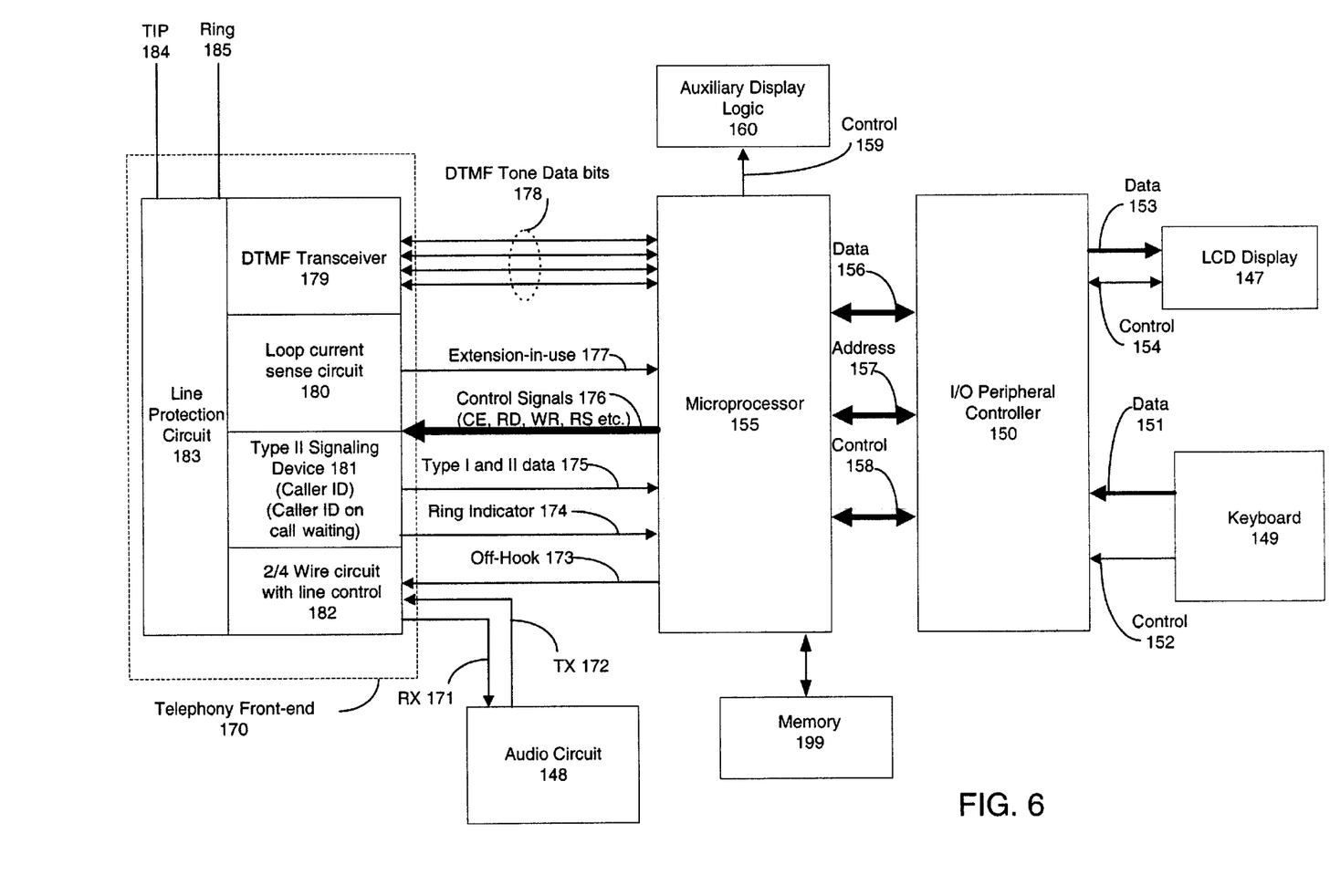
FIG. 6 is a block diagram of an exemplary portion of an embodiment of a message waiting interface device in accordance with the present invention.

Referring now to FIG. 6, there is illustratively shown a block diagram of an exemplary portion of an embodiment of a MWI device 113 in accordance with the present invention. MWI device 113 comprises telephony front-end 170, processor 155, memory 199, input/output (I/O) peripheral controller 150, output device 147, and input device 149.

Telephony front-end 170 comprises line protection circuit 183, 2/4 wire circuit with line control ("wire control") 182, Type II signaling device ("signaling device") 181, loop current sense circuit ("sense circuit") 180, and DTMF transceiver/call progress tone detector ("DTMF transceiver") 179. POT's line connections TIP 184 and Ring 185 are in electrical communication with protection circuit 183. Optionally, audio circuit 148, which may comprise a microphone and a speaker, may be coupled to telephony front-end 170. Audio receive and transmit information 171 and 172, respectively, may be used for communication between telephony front-end 170 and audio circuit 148. Signaling device 181 provides Type I and/or Type II data 175 and ring indicator signal 174 to processor 155. Signaling device 181 may comprise CID or CID on call waiting. Processor 155 may be a microprocessor, an application specific integrated circuit (ASIC), a microcontroller, or the like. Sense circuit 180 provides extension-in-use signal 177 to processor 155. DTMF tone data bits 178 to are sent between DTMF transceiver 179 and processor 155. DTMF transceiver 179 optionally works as a Call Progress Tone Detector and bits corresponding to call progress tone are sent to processor 155 using connections 178. In the exemplary embodiment shown in FIG. 6, a four bit wide data bus is used for DTMF tone data bits 178; however, fewer or more DTMF data bits may be used. Control signals 176, including without limitation enable, read, write, set, reset, among others, may be provided from processor 155 to telephony front-end 170 over a control bus.

Processor 155 is in electrical communication with memory 199 and I/O peripheral controller 150 via data bus 156, address bus 157, and control bus 158. I/O peripheral controller is in electrical communication with display 147, which may be an LCD, and input device 149, which may be a keyboard and/or data pad, via data buses 153 and 151, respectively, and control buses 154 and 152, respectively. Optionally, auxiliary display logic 160 may be coupled to processor 155 for operating an additional display, which display may be external to MWI device 113. Memory 199 may comprise non-volatile memory such as ROM, EEPROM, disk and the like, as well as volatile memory such as SRAM or DRAM.

Server Application Program

Figure 7A:
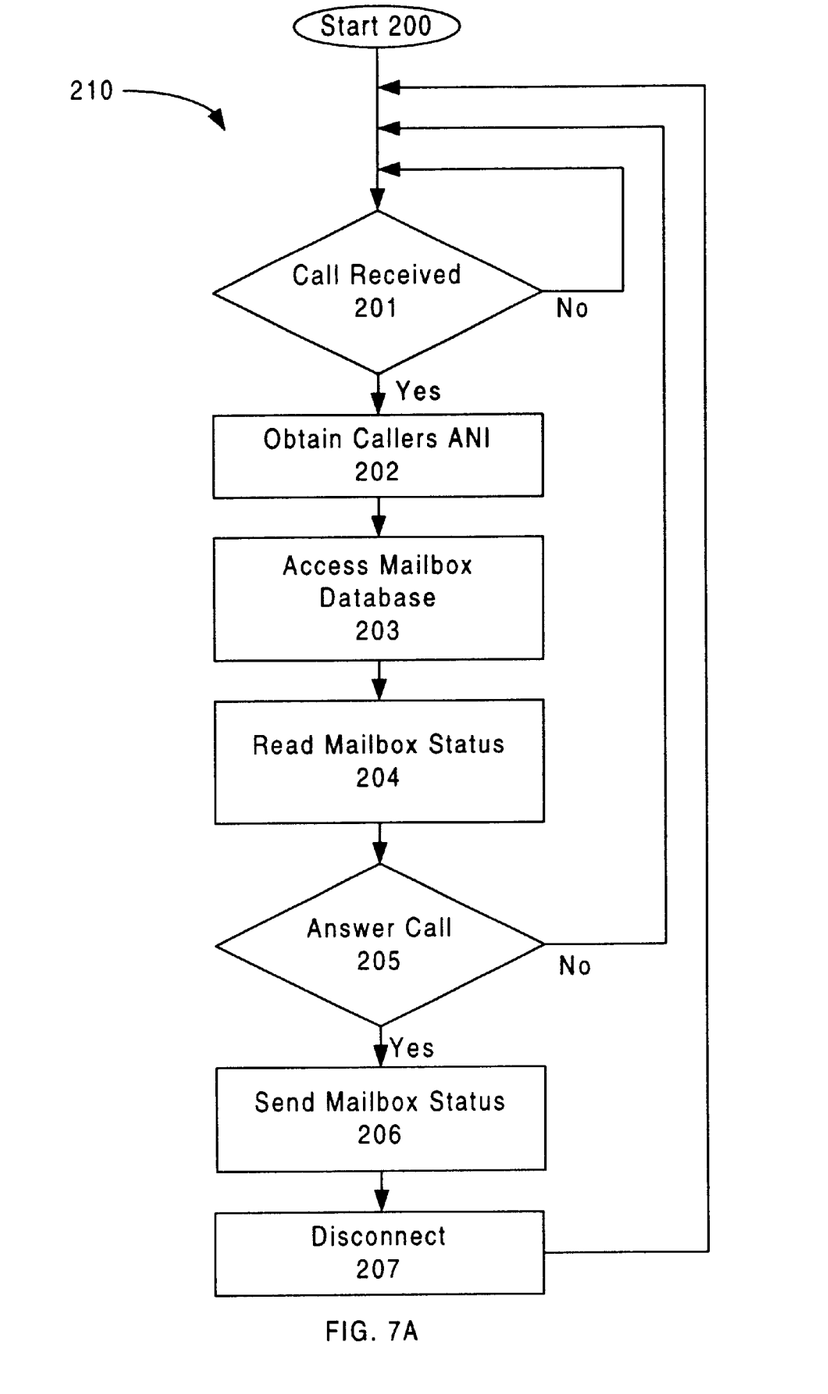
FIGS. 7A and 7B are flow diagrams of exemplary embodiments of a server application program in accordance with the present invention.
Figure 7B:
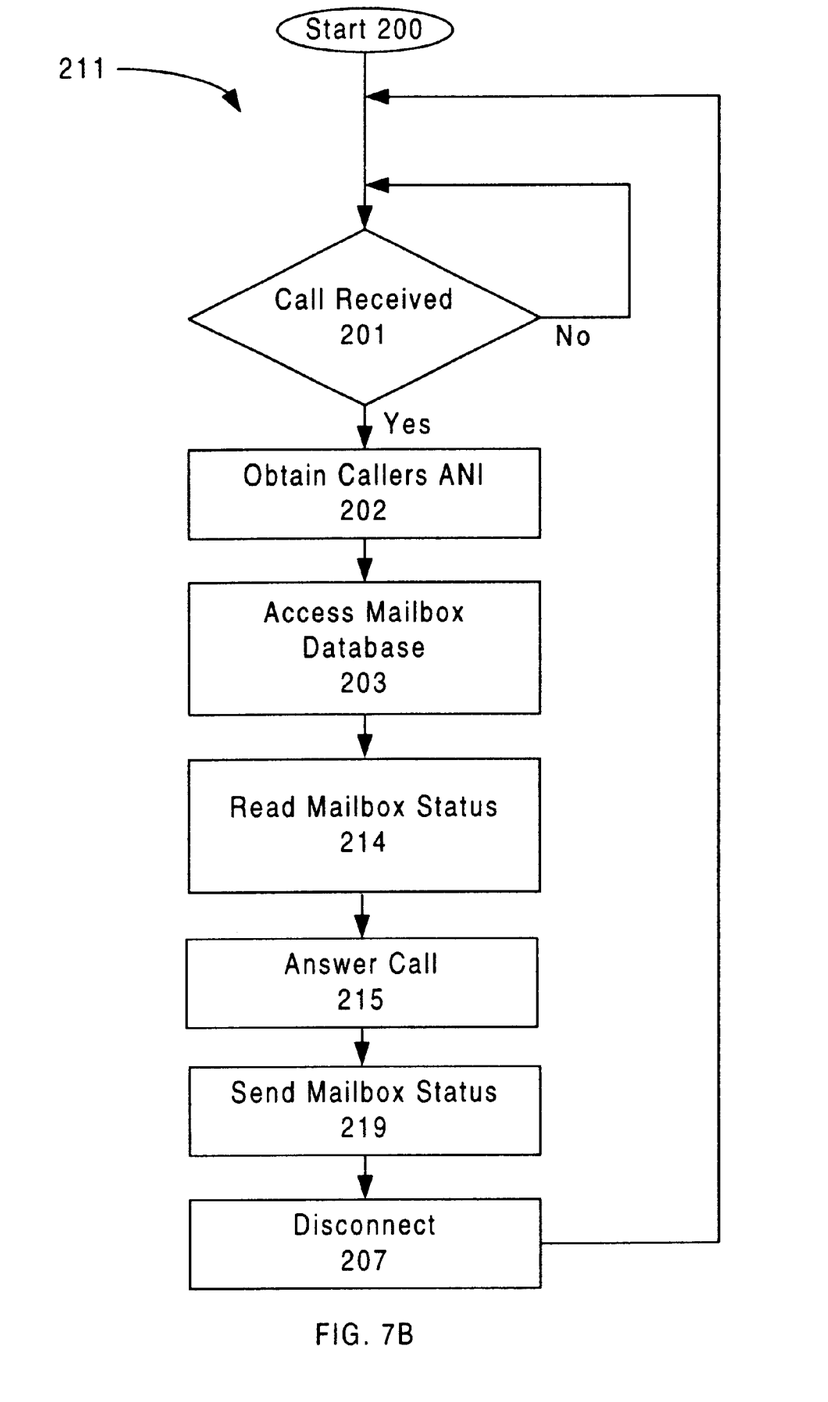

As mentioned elsewhere herein, VAMWI application 44 runs on MWI server 25. In FIGS. 7A and 7B there is shown flow diagrams for exemplary embodiments of server application routines 210 and 211 which may be used with MWI server 25 and UM server 27 (shown in FIGS. 1 and 2).

With continuing reference to FIGS. 7A and 7B and renewed reference to FIGS. 1 and 2, at 200, routines 210 and 211 are initiated. At 201, it is determined whether MWI server 25 receives an incoming call. If there is no incoming call, then routines 210 and 211 stay in a waiting or listening mode. In other words, MWI server 25 waits for an incoming call.

If an incoming call is received at 201, then at 202 MWI server 25 obtains caller ANI information. At 203, MWI server 25 connects to a mailbox database, as mentioned elsewhere herein, and access a subscriber's mailbox associated with ANI information obtained at 202.

In routine 210, after accessing a subscriber's mailbox, at 204 MWI server 25 determines if status of this mailbox is unchanged, namely, that there are no new messages. If it is determined that there are no new messages, then at 205 this incoming call is not answered and routine 210 returns to a listening mode. However, if it is determined that there are new messages, then at 205 such incoming call is answered, and at 206 mailbox status information is read and sent. This status information may be sent to MWI 13 as DTMF tones as previously described herein.

In routine 211, after accessing a subscriber's mailbox, at 214 MWI server 25 reads status information from such accessed mailbox. At 215, this incoming call is answered. At 219, status information read is sent. In this exemplary embodiment, if there are no new messages, a DTMF string may be sent indicating that there are no new messages. By way of example and not limitation, a "**" may be transmitted by MWI server 25 to indicate that there are no new messages.

At 207, routines 210 and 211 disconnect from an answered incoming call. After disconnecting, routines 210 and 211 return to a listening mode.

Although the present invention has been particularly shown and described with respect to certain embodiments thereof, including without limitation a best mode if any, it should be readily apparent to those of skill in the art that various structural, logical, electrical, and other changes in form and detail may be made to these embodiments without departing from the scope of the present invention as set forth in the appended claims. Accordingly, the present invention is defined only by the appended claims that follow this detailed description.

What is claimed is:

1. A system for unified messaging, comprising:
   a message-waiting interface, the message interface configured to provide an indication of a number of messages for each of a plurality of message types;
   a first switching matrix in electrical communication with the message interface;

a first gateway in electrical communication with the first switching matrix;

a wideband network in electrical communication with the first gateway;

a second gateway in electrical communication with the wideband network;

a second switching matrix in electrical communication with the second gateway; and a message server in electrical communication with the second switching matrix and programmed with a message server application, the message server operatively coupled to message mailboxes data storage, the message server application programmed to selectively access a message mailbox of the message mailboxes data storage, the message mailboxes data storage adapted to store each of the plurality of message types.

2. The system of claim 1, wherein each of the first gateway and the second gateway is an Internet Protocol/Public Switched Telephone Network (IP/PSTN) gateway.

3. The system of claim 2, wherein each of the first switching matrix and the second switching matrix is a telephone-switching matrix.

4. The system of claim 3, wherein the wideband network comprises a portion of an Internet backbone network.

5. A system for unified messaging, comprising:

a telephone;

a message interface in electrical communication with the telephone, the message interface configured to provide an indication of a number of messages for each of a plurality of message types;

a first telephone-switching matrix in electrical communication with the message interface;

a first internet/telephone gateway in electrical communication with the first telephone-switching matrix;

a wideband network in electrical communication with the first internet/telephone gateway;

a second internet/telephone gateway in electrical communication with the wideband network;

a second telephone-switching matrix in electrical communication with the second internet/telephone gateway; and a message server in electrical communication with the second telephone-switching matrix and programmed with a message server application, the message server operatively coupled to a data store of message mailboxes, the message server application programmed to selectively access the data store of message mailboxes to access a selected message mailbox, the message mailbox adapted to receive any of the plurality of message types.

6. The system of claim 5, wherein at least two of the plurality of message types are selected from a group comprising voicemail, fax mail, e-mail, data mail, video mail, picture mail, and videoconference mail.

7. A system for unified messaging, comprising:

a telephone;

a message interface operatively coupled to the telephone and configured to provide an indication of a number of messages for each of a plurality of message types;

a local loop network operatively coupled to the message interface;

a local telephone switching office operatively coupled to the local loop network;

a first primary rate communication link operatively coupled to the local telephone switching office;

a first internet protocol/public switched telephone network (IP/PSTN) gateway operatively coupled to the telephone-switching matrix and configured for converting PSTN information to voice over IP (VOIP) information;

a first IP communication link operatively coupled to the first IP/PSTN gateway and configured for handling VOIP information;

an IP backbone network operatively coupled to the first IP communication link and configured for handling VOIP information;

a second IP communication link operatively coupled to the IP backbone network and configured for handling VOIP information;

a second IP/PSTN gateway operatively coupled to the second IP communication link and configured for converting VOIP information to PSTN information;

a second primary rate communication link operatively coupled to the second IP/PSTN gateway;

a telephone-switching matrix operatively coupled to the second primary rate communication link;

a third primary rate communication link operatively coupled to the telephone-switching matrix; and a message server operatively coupled to the third primary rate communication link and programmed with a message server application, the message server operatively coupled to a data store of message mailboxes, the message server application programmed to selectively access the data store of message mailboxes, the message mailboxes adapted to receive any of the plurality of message types, wherein at least two of the plurality of message types are selected from a group comprising voicemail, fax mail, e-mail, data mail, video mail, picture mail and videoconference mail.

8. A system for unified messaging, comprising:

a point-of-presence (POP), the POP comprising customer premises' equipment, a message interface device, a first switching matrix and a first gateway, the message interface device configured to provide a new message indication selected from audio and visual indicators, the new message indication associated with a plurality of new messages, each of the plurality of new messages having a different format selected from a plurality of message types;

a wideband network operatively coupled to the POP with a first communication link; and a remote unified messaging network operatively coupled to the wideband network with a second communication link, the remote unified messaging network comprising a message interface server programmed with a message interface application, a data store of mailboxes, a second switching matrix and a second gateway, the data store of mailboxes configured to store each of the plurality of new messages.

9. A system for unified messaging, comprising:

a point-of-presence (POP), the POP comprising:

customer premises' equipment;

a message interface device operatively coupled to the customer premises' equipment, the message interface device configured to provide an indication of new messages having at least two formats selected from voicemail, fax mail, e-mail, data mail, video mail, picture mail and videoconference mail, the indication having at least one format selected from audio and visual;

a first telephonic switching matrix operatively coupled to the message interface; and a first telephonic/internet protocol gateway, the message interface device configured to provide a new message indication;

a wideband network operatively coupled to the POP with a first communication link; and a remote unified messaging network operatively coupled to the wideband network with a second communication link, the remote unified messaging network comprising:

a message interface server programmed with a message interface application;

a data store of mailboxes operatively coupled to the message interface server, the data store of mailboxes configured to store the new messages;

a second telephonic switching matrix operatively coupled to the message interface server; and a second telephonic/internet protocol gateway operatively coupled to the second telephonic switching matrix and to the second communication link.

10. A method for voicemail in a system, the method comprising:

providing customer premises' equipment;

providing a message interface;

providing a unified messaging server;

providing a first call to the customer premises' equipment;

receiving a second call to the customer premises' equipment while engaged with the first call;

forwarding the second call to the unified messaging server while engaged with the first call;

automatically placing a third call to the unified messaging server in response to receiving the second call while engaged with the first call; and establishing connectivity from the message interface to the unified messaging server for obtaining information associated with the second call deposited at a target location associated with the customer premises' equipment.

11. A method for voicemail in a system having a first and a second telephonic communication conduit and an internet protocol communication conduit, the method comprising:

providing a message interface;

providing a message server;

providing a first call;

providing a second call from the message interface to the first telephonic communication conduit while engaged with the first call in response to condition selected from forward, busy and no answer;

providing the second call from the first telephonic communication conduit to the internet protocol communication conduit;

configuring the second call to a voice over internet protocol call for transport over the internet protocol conduit;

providing the voice over internet protocol call to the second telephonic communication conduit;

configuring the voice over internet protocol call to a third call;

providing the third call to a messaging server; and establishing connectivity from the message interface to the messaging server for providing the first call to a target message box.

12. The method of claim 11, further comprising monitoring the first call with the message interface for a condition selected from available and answered.

13. A method for connecting to a unified messaging network, comprising:

providing a first telephonic device;

providing a point-of-presence (POP), the POP having a switching office, a first gateway, a second telephonic device and a messaging interface;

providing a remote unified messaging server network, the remote unified messaging server network having a second gateway and a unified messaging server;

placing a public switched telephone network (PSTN) call from the first telephonic device to the second telephonic device;

routing the PSTN call from the messaging interface to the switching office;

obtaining subscriber information associated with the call at the switching office;

routing the PSTN call and the subscriber information from the switching office to the first gateway;

querying a database associated with the first gateway using the subscriber information;

obtaining from the database internet protocol address information associated with the subscriber information;

formatting the PSTN call to provide a voice over internet protocol (VOIP) call;

routing the VOIP call in accordance with the internet protocol address information to the second gateway;

converting the VOIP call to the PSTN call; and routing the PSTN call to the unified messaging server.

14. The method of claim 13, further comprising obtaining caller information associated with the PSTN call from the switching office for routing to the first gateway.

15. The method of claim 13, wherein the PSTN call is formatted to the VOIP call by the first gateway.

16. The method of claim 14, wherein the VOIP call is converted to the PSTN call by the second gateway.

17. A method for connecting to a unified messaging mailbox, comprising:

providing a point-of-presence (POP), the POP having a switching office, a first gateway, and a messaging interface, the messaging interface having an access number;

providing a remote unified messaging server network, the remote unified messaging server network having a second gateway and a unified messaging server network, the unified messaging server network having a data store of mailboxes and a server;

receiving a first call to the messaging interface;

waiting a duration of time without answer to the first call;

placing a second call to the switching office using the access number;

obtaining subscriber information associated with the second call;

sending the second call and the subscriber information to the first gateway;

accessing internet protocol address information using the subscriber information;

converting the second call from a publicly switched telephone network format to a voice over internet protocol (VOIP) format;

sending the second call formatted for VOIP from the first gateway to the second gateway using the internet protocol address information;

converting the second call from the VOIP format to the PSTN format;

sending the second call formatted for PSTN from the second gateway to the unified messaging server network;

providing the second call to the first server;

querying a selected mailbox of the data store of mailboxes in response to the second call; and answering the second call if at least one new message is found from the querying of the selected mailbox, the answering including providing a tone sequence associated with the at least one new message.

18. The method of claim 17, wherein the tone sequence indicates message type and number of messages of each type.

19. The method of claim 18, wherein the tone sequence is selected from a dual tone multiple frequency tone sequence and a frequency shift keyed tone sequence.

20. The method of claim 18, wherein the message type is selected from voicemail, e-mail, fax mail, videoconference mail, video mail, picture mail and data mail.

21. The method of claim 18, further comprising:

providing the tone sequence to the message interface; and providing an alert in response to finding the at least one new message.

22. The method of claim 21, wherein the alert is selected from a visual alert and an audible alert.

23. The method of claim 22, further comprising:

detecting answering the first call; and terminating the second call.

24. A method for connecting to a unified messaging mailbox of a unified messaging subscriber, comprising:

providing a point-of-presence (POP), the POP having a switching office, a first gateway, and a messaging interface, the messaging interface having an access number;

providing a remote unified messaging server network, the remote unified messaging server network having a second gateway and a unified messaging server network, the unified messaging server network having a data store of mailboxes and a server;

placing a first call to a unified messaging subscriber;

encountering an unavailable condition for the unified messaging subscriber;

placing a second call to the switching office using the access number;

obtaining subscriber information associated with the second call;

sending the second call and the subscriber information to the first gateway;

accessing internet protocol address information using the subscriber information;

converting the second call from a publicly switched telephone network format to a voice over internet protocol (VOIP) format;

sending the second call formatted for VOIP from the first gateway to the second gateway using the internet protocol address information;

converting the second call from the VOIP format to the PSTN format;

sending the second call formatted for PSTN from the second gateway to the unified messaging server network;

providing the second call to the first server;

querying a selected mailbox of the data store of mailboxes in response to the second call; and answering the second call if at least one new message is found from the querying of the selected mailbox, the answering including providing a tone sequence associated with the at least one new message.

25. The method of claim 24, wherein the tone sequence indicates message type and number of messages of each type.

26. The method of claim 25, wherein the tone sequence is selected from a dual tone multiple frequency tone sequence and a frequency shift keyed tone sequence.

27. The method of claim 25, wherein the message type is selected from voicemail, e-mail, fax mail, videoconference mail, video mail, picture mail and data mail.

28. The method of claim 25, further comprising:

providing the tone sequence to the message interface; and providing an alert in response to finding the at least one new message.

29. The method of claim 28, wherein the alert is selected from a visual alert and an audible alert.

30. A method for checking for at least one new message at a unified message mailbox, comprising:

providing a point-of-presence (POP), the POP having a switching office, a first gateway, and a messaging interface, the messaging interface having an access number;

providing a remote unified messaging server network, the remote unified messaging server network having a second gateway and a unified messaging server network, the unified messaging server network having a data store of mailboxes and a server;

periodically placing a call to the switching office using the access number;

obtaining subscriber information associated with the call;

sending the call and the subscriber information to the first gateway;

accessing internet protocol address information using the subscriber information;

converting the call from a publicly switched telephone network format to a voice over internet protocol (VOIP) format;

sending the call formatted for VOIP from the first gateway to the second gateway using the internet protocol address information;

converting the call from the VOIP format to the PSTN format;

sending the call formatted for PSTN from the second gateway to the unified messaging server network;

providing the call to the server;

querying the unified message mailbox of the data store of mailboxes in response to the call; and answering the call if the at least one new message is found from the querying of the unified message mailbox, the answering including providing a tone sequence associated with the at least one new message.

31. The method of claim 30, wherein the tone sequence indicates message type and number of messages of each type.

32. The method of claim 31, wherein the tone sequence is selected from a dual tone multiple frequency tone sequence and a frequency shift keyed tone sequence.

33. The method of claim 31, wherein the message type is selected from voicemail, e-mail, fax mail, videoconference mail, video mail, picture mail and data mail.

34. The method of claim 31, further comprising:
providing the tone sequence to the messaging interface; and
providing an alert in response to finding the at least one new message.

35. The method of claim 34, wherein the alert is selected from a visual alert and an audible alert.

36. The method of claim 30, further comprising programming the access number into the messaging interface.

37. The method of claim 30, further comprising:
obtaining automatic number identification information;
providing the automatic number identification information to the server; and
querying a database of local access numbers using the automatic number identification information.

38. The method of claim 37, further comprising:
obtaining a local access number from the database of local access numbers; and
providing a tone sequence for the local access number to the messaging interface.

39. The method of claim 38 further comprising storing the tone sequence in memory of the messaging interface.

40. The method of claim 30, further comprising:
providing a plain old telephone (POT);
placing the messaging interface in a programming mode;
aplacing the messaging interface in an off-hook condition;
dialing a local access number with the POT;
listening with the messaging interface for dual tone multiple frequency (DTMF) tones; and
storing the DTMF tones to provide the access number for the messaging interface.

41. The method of claim 30, further comprising time stamping the messaging interface after the answering of the call.

42. The method of claim 30, further comprising providing status information associated with the tone sequence to a location remote from the messaging interface.

43. The method of claim 42, wherein the messaging interface comprises a remote access number.

44. The method of claim 43, wherein the remote access number is selected from a cell phone number and a pager number.

45. The method of claim 44, further comprising providing ancillary information to the remote location.

46. A method for setting status for a unified message mailbox, comprising:
providing a point-of-presence (POP), the POP having a switching office, a first gateway and a messaging interface;
providing a remote unified messaging server network, the remote unified messaging server network having a second gateway and a unified messaging server network, the unified messaging server network having a data store of mailboxes and a server, the server programmed with an application;
placing a call from the application on the server to the messaging interface;
providing caller identification information with the call;
sending the call and the caller identification information to the second gateway;
accessing internet protocol address information for the messaging interface;
converting the call from a publicly switched telephone network format to a voice over internet protocol (VOIP) format;
sending the call formatted for VOIP from the second gateway to the first gateway using the internet protocol address information;
converting the call from the VOIP format to the PSTN format;
sending the call formatted for PSTN from the first gateway to the messaging interface;
answering the call with the messaging interface;
sending a first tone sequence to the server indicating the call has been answered; and
sending a second tone sequence from the application to set status of the messaging interface.

47. A method for setting status for a unified message mailbox, comprising:
providing a point-of-presence (POP), the POP having a switching office, a first gateway and a messaging interface;
providing a remote unified messaging server network, the remote unified messaging server network having a second gateway and a unified messaging server network, the unified messaging server network having a data store of mailboxes and a server, the server programmed with an application;
placing a call from the application on the server to the messaging interface;
providing caller identification information with the call;
sending the call and the caller identification information to the second gateway;
accessing internet protocol address information for the messaging interface;
converting the call from a publicly switched telephone network format to a voice over internet protocol (VOIP) format;
sending the call formatted for VOIP from the second gateway to the first gateway using the internet protocol address information;
converting the call from the VOIP format to the PSTN format;
sending the call formatted for PSTN from the first gateway to the messaging interface;
answering the call by a user;
sending a first tone sequence to the server from the messaging interface indicating the call has been answered by the user; and
sending a second tone sequence from the application to the user indicating a message status.

48. A method for setting status for a unified message mailbox, comprising:
providing a point-of-presence (POP), the POP having a switching office, a first gateway and a messaging interface;
providing a remote unified messaging server network, the remote unified messaging server network having a second gateway and a unified messaging server network, the unified messaging server network having a data store of mailboxes and a server, the server programmed with an application;
placing a call from the application on the server to the messaging interface;
providing caller identification information with the call;
sending the call and the caller identification information to the second gateway;
accessing internet protocol address information for the messaging interface;

converting the call from a publicly switched telephone network format to a voice over internet protocol (VOIP) format;

sending the call formatted for VOIP from the second gateway to the first gateway using the internet protocol address information;

converting the call from the VOIP format to the PSTN format;

sending the call formatted for PSTN from the first gateway to the messaging interface;

answering the call by a user; and providing an indication to the user from the messaging interface regarding message status.

49. A messaging interface device, comprising:

a telephony front-end, the telephony front-end comprising:

a transceiver;

a loop current sense circuit;

a signaling device;

a line protection circuit; and a wire circuit a processor operatively coupled to the telephony front-end;

memory operatively coupled to the processor;

an input/output (I/O) controller operatively coupled to the processor;

an output device operatively coupled to the I/O controller; and an input device operatively coupled to the controller.

* * * * *